United States Patent [19]
Burdette, II

[11] Patent Number: 5,338,577
[45] Date of Patent: Aug. 16, 1994

[54] METAL WITH CERAMIC COATING AND METHOD

[75] Inventor: Jackie B. Burdette, II, Guyton, Ga.

[73] Assignee: Kemira, Inc., Savannah, Ga.

[21] Appl. No.: 62,066

[22] Filed: May 14, 1993

[51] Int. Cl.$^5$ .............................................. B05D 1/08
[52] U.S. Cl. ..................... 427/453; 427/454; 427/455; 427/456; 427/398.1; 427/405; 427/419.2; 427/427
[58] Field of Search ............... 427/398.1, 454, 456, 427/452, 453, 455, 405, 419.2, 427, 325

[56] References Cited

U.S. PATENT DOCUMENTS

| | | | |
|---|---|---|---|
| 3,723,165 | 3/1973 | Longo et al. | 427/452 |
| 4,230,748 | 10/1980 | Patel | 427/452 |
| 4,503,093 | 3/1985 | Iseli et al. | 427/248.1 |
| 4,588,655 | 5/1986 | Kushner | 428/633 |
| 4,599,270 | 7/1986 | Rangaswamy et al. | 427/453 |
| 4,645,716 | 2/1987 | Harrington et al. | 427/453 |

*Primary Examiner*—Shrive Beck
*Assistant Examiner*—Benjamin L. Utech
*Attorney, Agent, or Firm*—Deveau, Colton & Marquis

[57] ABSTRACT

A coated metal substrate with a ceramic composition and method which involves applying several layers of the following materials:

a. stainless steel
b. thermal shock resistant ceramic coating; and
c. abrasion resistant ceramic material.

Each layer of each material is applied by flame spray means to the metallic substrate which is at a temperature above 250° F. but below 500° F., which is then cooled to a temperature below 250° F. before applying the next layer. Zirconium oxide is a preferred thermal shock resistant ceramic coating and aluminum oxide is the preferred abrasion resistant ceramic material.

9 Claims, 1 Drawing Sheet

METAL WITH CERAMIC COATING AND METHOD

FIELD OF THE INVENTION

This invention relates generally to a coated metal substrate and a method for coating a metal substrate to improve the wear characteristics of the metal component and relates more specifically to a method for coating a metal component with a stainless steel coating and two or more ceramic coatings which have improved thermal, abrasion and corrosion resistance characteristics so as to protect the metal component from the negative effects of abrasion, temperature and oxidation.

PRIOR ART

Coating a metal component with a thin layer of a ceramic material or another metal has been practiced for many years. One primary purpose of a coating process is to protect the surface of a fragile metal product or substrate from abrasion or thermal degradation. (i.e., melting) or oxidation by coating it with a more abrasion resistant and thermal degradation resistant material. Recently, various ceramics having high abrasion resistance or high oxidation resistance characteristics have been used to coat metal substrates. One method for applying a ceramic coating to the substrate is by spraying the ceramic coating onto the substrate.

Early equipment used for the ceramic spray-coating process, which typically is called flame spraying, included a wire-type flame sprayer. The protective coatings that can be applied this way are limited to those materials that can be formed into a wire or rod. Comercially-available spray guns permit the use of an almost infinite variety of metals, alloys, ceramics and cermets which can be ground into a relatively fine powder to coat the object.

Normally, the surface of the object to be sprayed must be prepared for spraying. Precleaning, under-cutting and blasting have been used as pretreatment processes.

The typical spray gun is designed to apply self-fluxing alloys, self-bonding alloys, as well as oxidation-resistant alloys. Deposit effectiveness varies from greater than 90% with most metals and 85–95% with the high temperature melting refractories.

The gun generally requires no air, but uses acetylene as a fuel and oxygen for combustion. A powder reservoir is attached to the gun and an air cooler may be attached to the gun to prevent over-heating. Some metal powders require a triggered vibrator to maintain powder movement from the powder reservoir to the gun. The gun can either be "hand-held" or attached to a lathe for larger work, which rotates the metal component to be coated. Typically, the gun moves perpendicular to axis of the rotating object to be sprayed.

Flame spraying involves heating a heat fusible material, such as metal or ceramic, to the point where it can be atomized and propelled through the gun onto the surface to be coated. The heated particles strike the surface and bond to it.

In the typical spray gun, the acetylene and oxygen act as the fuel and combustion gas, respectively, creating the flame. Flame spraying includes plasma spraying, oxyacetylene torch spraying and Thermo spraying.

A flame spray gun utilizes combustion or plasma flame to produce the necessary heat to melt the coating material. Other heating means such as electric arcs and resistance heaters may also be used in a powder combustion flame spray gun. The carrier gas for the powder can be a combustion gas such as oxygen or even an inert gas such as nitrogen. In a plasma spray gun, the primary plasma gas is generally an inert gas such as nitrogen or argon. The coating material can be supplied to the flame spray gun as a rod or wire or as a powder.

The high thermal efficiency of the flame spraying gun makes it possible to spray these refractory materials at rates and deposit efficiencies which make the coatings economically feasible. Examples of coatings produced by the flame spraying gun process are found in Ingham, H. S. & A. P. Shepard, Flame Spray Handbook, Vol. II (Metco Inc.)(2d ed 1964).

Coatings of aluminum and zirconium are of great interest as thermal barriers, particularly in the rocket and jet engine field. Coatings of this type must be somewhat porous in order to resist the high thermal shock encountered and to improve their effectiveness as thermal barriers. Therefore, they are quite different from the fused coatings of low melting ceramics which are classed as vitreous enamels, and they must be applied over oxidation-resistant base materials if they are to be exposed to high temperatures and oxidizing atmospheres. Ceramic coatings are porous by nature and may not afford much oxidation or corrosion protection to the base material. Undercoats made from oxidation-resistant metals or alloys may be used between the base material and the ceramic coating if the bare material is not corrosion resistant.

Various ceramic coatings of different compositions currently are used to coat substrates. Ceramic coatings containing aluminum oxide often are used for wear protection as aluminum oxide has high abrasion resistance. Flame sprayed ceramic coatings containing refractories, such as zirconium oxide, are frequently used for thermal barrier protection of metal subjected to high temperatures. It is understood that zirconium oxide frequently contains some hafnium oxide and other impurities. It may be stabilized with calcium oxide or yttrium oxide.

Typically, ceramic coatings having high thermal resistance, have a low wear resistance, while ceramic coatings having a high wear resistance have a low thermal resistance. The general reason for this relationship is that ceramic coatings having a high thermal resistance typically are more sponge-like and have a higher void content allowing thermal dissipation yet allowing easier abrasion, while ceramic coatings having a high abrasion resistance have a lower void content, thus reducing abrasion while at the same time lowering the heat dissipation properties.

U.S. Pat. No. 4,645,716 to Harrington et al. discloses and claims a homogeneous ceramic composition formed of $ZrO_2$, $Y_2O_3$ and $TiO_2$. This is the mixed oxide technology discussed above. The mixture of zirconium oxide, yttrium oxide, and titanium oxide combines components having relatively high thermal shock resistance and relatively high wear resistance. However, the combination of these components results in a coating having the average thermal shock resistance and wear resistance of the various components, and is not a multi-layer coating which retains the properties of the high thermal shock resistance and wear resistance of the components themselves.

U.S. Pat. No. 4,503,093 to Iseli et al. discloses a fully-fused thermally sprayable cordierite which is capable of releasing sufficient exothermic energy when heated by thermal spraying to promote the adhesiveness of the coating to the substrate. The thermally sprayable ceramic disclosed by Iseli et al. was developed to reduce the effects of thermomechanical shock on coatings, namely to reduce the damage caused to coatings by temperature induced expansion and contraction and by vibration. The main disadvantage of the Iseli et al. coating is its relatively low abrasion resistance due, in part, to its lack of an abrasion resistant ceramic such as aluminum oxide.

U.S. Pat. No. 4,588,655 to Kushner discloses a mixture of $ZrO_2$ and $Al_2O_3$, so as to combine the thermal resistance of zirconium oxide coatings with the wear resistance of aluminum oxide coatings. The Kushner composition has from about 10% to 50% aluminum oxide with the balance being zirconium oxide. The combination of zirconium oxide and aluminum oxide results in a composition having thermal resistance and wear resistance somewhere between the thermal resistance and wear resistance of the two components. Therefore the resulting coating has a thermal resistance greater than pure aluminum oxide, yet not quite as great as zirconium oxide, and a wear resistance greater than pure zirconium oxide, but not as great as pure aluminum oxide. While the Kushner composition is a useful improvement in the art, its thermal and wear resistance characteristics still leave much to be desired.

Therefore, it can be seen that there is yet a need for a method for the ceramic coating of metal substrates which results in improved thermal resistance and improved wear resistance. The current state of the an in ceramic coating processes, namely combinations of various ceramic components, results in a composite coating having properties near the relative average of the component material, rather than combining the best properties of each component. It is to that end that this invention is directed.

SUMMARY OF THE INVENTION

The present invention is a method for the ceramic coating of metal substrates. According to the invention, a stainless steel layer is applied to the substrate. The stainless steel initial layer improves the seal of the subsequent coatings and increases the bonding of them to the metal substrate and to each other. Stainless steel has the capability of producing a very strong bond with ceramics, particularly zirconium oxide. This makes it easier for the aluminum oxide final coating to form the erosion resistant portion of the overall system.

After the application of the stainless steel coating, an intermediate layer of zirconium oxide is then sprayed onto the stainless steel coating on the substrate. An outer layer of aluminum oxide is then sprayed over the zirconium oxide coating. The temperature of the substrate is controlled during the application of the aluminum oxide and zirconium oxide coatings in order to prevent excessive expansion of the substrate which can result in breakage or cracks developing as the substrate contracts during cooling. It is preferred that the temperature is also controlled during the application of the stainless steel coating. Preferably the substrate is cooled between each pass for each coating layer.

Preferably, several layers of each coating are sprayed onto the substrate. Preferably, from four to eight passes are made for the stainless steel coating, and between eight to sixteen passes are made for both the zirconium oxide coating and the aluminum oxide coating. It is important that the substrate be cooled to a temperature less than 250° F. after the application of the zirconium oxide coating before applying the aluminum oxide coating. Air cooling typically is sufficient for this purpose. Without this cooling the substrate may become so hot that it expands excessively which can results in cracks developing in the coatings upon cooling. It is preferred that the substrate be cooled between the application of each layer of the zirconium oxide and aluminum oxide coatings. It is also preferred that the substrate be cooled between the application of each layer of the stainless steel coating as well. In addition to cooling the substrate to below 250° F., the time of exposure of the substrate to the high temperature of the coating application can also be limited. The temperature of the substrate during application of the zirconium oxide and aluminum oxide coatings should not exceed 700° F. and preferably be below 500° F. The amount of cooling required is dependent upon the coefficient of expansion of the substrate. More cooling is required if the substrate has a high coefficient of expansion. Excessive expansion of the substrate during the application of these coatings can result not only in cracks developing but may also result in the coatings breaking off from the substrate.

The resulting coating typically is approximately 0.030 of an inch thick, with the stainless steel coating being 0.005 of an inch thick, the zirconium oxide coating being 0.015 of an inch thick, and the aluminum oxide coating being 0.010 of an inch thick.

It has been found that this multi-level coating provides the ceramic metal bond strength necessary to bond the ceramic coatings to protect the metal from heat and thermal deterioration (melting or oxidation) and maintain the thermal resistant zirconium oxide coating and wear resistant aluminum oxide coating without suffering reduction in those properties.

Accordingly, it is an object of the present invention to provide the metal bond strength of stainless steel so that the thermal resistance of the pure zirconium oxide coating and the wear resistance of a pure aluminum oxide coating can be utilized.

It is another object of the present invention to provide a method for the coating of metal substrate which results in a coating having a higher thermal resistance and wear resistance properties than current ceramic coatings.

Another object of the present invention is to provide a method of ceramic coating a metal substrate which uses a three layer system of spray to protect a metal substrate.

Yet another object of the present invention is to provide a method for the ceramic coating of a metal substrate in which the typically softer and more heat resistant coating layer is protected by overcoating with the typically harder, more abrasive resistant layer.

Still another object of the present invention is to provide a method for the ceramic coating of metal substrates which results in a coating which is longer lasting than, yet has substantially similar heat resistant characteristics as, a pure zirconium oxide coating by overcoating the zirconium oxide coating with a high wear resistant and long lasting aluminum oxide coating.

Yet another object of the present invention is to provide a method for the ceramic coating of a metal substrate which results in a coating that has the long life of the high wear resistant aluminum oxide coating, yet also has the high thermal resistant characteristics of a zirconium oxide coating.

It is a further object of the present invention to provide a method for the ceramic coating of metal substrates which is simple and economical in application and results in a durable and efficient coating.

These objects, and other objects, features and advantages of the present invention, will become more apparent to one skilled in the an when the following detailed description of a preferred embodiment is read in conjunction with the attached drawing figure.

P BRIEF DESCRIPTION OF THE DRAWING FIGURE

FIG. 1 is a schematic in cross-section of the coating achieved by the process of the present invention.

DETAILED DESCRIPTION OF THE PREFERRED EMBODIMENT

Figure 1:
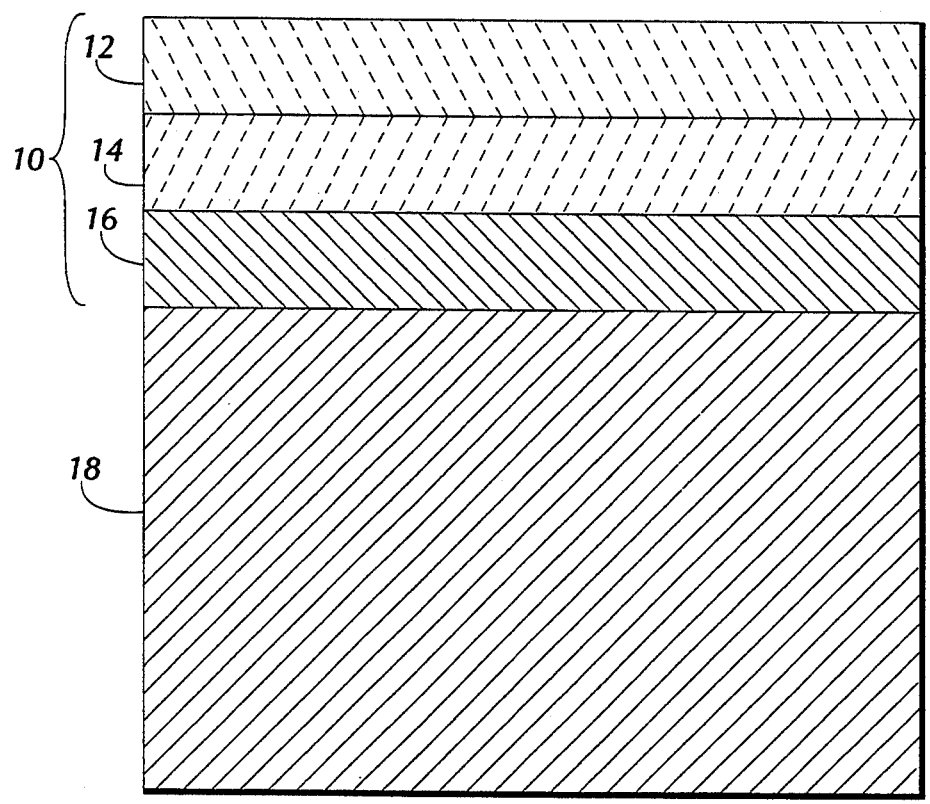

The present invention is a method of applying a ceramic coating to a metal substrate resulting in a coating which protects the metal substrate from corrosion, thermal shock and abrasion while exhibiting high thermal shock and wear resistance itself. It has been discovered that this protection can be obtained by first coating the metal substrate with stainless steel followed by a coating of zirconium oxide and finally a coating of aluminum oxide. The coating resulting from the invention is shown as a schematic in FIG. 1 in which the reference numeral 10 represents the coating and reference numeral 18 represents the metal substrate. As will be described in more detail below, a layer of stainless steel 16 is first applied to the substrate 18. A layer of zirconium oxide 14 is then applied over the layer of stainless steel 16. A layer of aluminum oxide 12 is then applied over the layer of zirconium oxide resulting in the coating 10 comprising aluminum oxide 12, zirconium oxide 14 and stainless steel 16.

Each of the coating layers 12, 14, 16 has a particular purpose. Stainless steel 16 has the property of strengthening the bond between the metal substrate 18 and the zirconium oxide coating 14. The stainless steel coating 16 also prevents the metallic substrate 18 from experiencing thermal degradation such as oxidation.

Zirconium oxide has high thermal resistance but low abrasion resistance. Therefore, a coating comprising only zirconium oxide may protect the substrate from thermal resistance, but will not protect the substrate to any great degree from abrasion. On the contrary, aluminum oxide has high abrasion resistance yet low thermal shock resistance. Therefore, a coating comprising only aluminum oxide will prevent wear on the substrate but not protect the substrate from thermal shock. Therefore, it is advantageous to have coatings of both zirconium oxide and aluminum oxide to provide for enhanced thermal shock resistance and enhanced abrasion resistance.

The aluminum oxide coating 12 is applied over the zirconium oxide coating 14 so as to protect both the zirconium oxide coating 14 and the substrate 18 from abrasion. Although composite coatings of zirconium oxide and aluminum oxide are known in the art, applying these two coatings independently of each other onto a substrate in separate layers by flame spraying has not been accomplished. As described more fully below, typical flame spraying techniques have resulted in the failure or disintegration of both aluminum oxide coating and zirconium oxide coatings. It has been discovered that by using a flame spraying gun and cooling the metal substrate to a temperature of less than 250° F. after the application of the zirconium oxide coating, but before the application of the aluminum oxide coating, disintegration of these coatings is avoided. Air cooling is typically sufficient for this purpose.

It is preferable that several layers of each coating are sprayed onto the substrate. Preferably, from four to eight passes are made for the stainless steel and between eight to sixteen passes are made for both the zirconium oxide coating and the aluminum oxide coating. The cooling after the application of the zirconium oxide coating prevents a substrate from becoming so hot that it results in excessive expansion which can cause disintegration or cracks to develop in the coating during the contraction of the substrate while cooling. It is preferred that the temperature be controlled by cooling the substrate to below 250° F. between each pass for each coating layer and limiting the time of exposure of the substrate to the high temperature of the coating application. The temperature of the substrate during application of a coating layer of zirconium oxide or aluminum oxide should not exceed 700° F. and preferably be below 500° F. It is also preferred that the substrate be cooled between each pass of the application of the stainless steel layer as well. The maximum temperature of the substrate permitted during application of the zirconium oxide and aluminum oxide coatings is determined by the coefficient of expansion of the particular metallic substrate being used. Generally it should be approximately 200° F. below the melting point and preferably 400° F. below the melting point. Substrates with lower coefficients of expansion do not have to be cooled as much as substrates with higher coefficients. The metallic substrate expands with heat and contracts upon cooling. The zirconium oxide and aluminum oxide coatings expand and contract very little in response to temperature changes.

The dense, hard ceramic coatings, such as aluminum oxide used for wear applications, require an extremely good bond to the substrate 18 since internal stresses are higher and thermal shock resistance is much lower than that of more porous coatings, such as zirconium oxide, required for thermal barriers. Stresses in the coating 10 increase as the thickness increases so a much higher bond strength is required for heavier coatings. The hard-wear resistant coatings, such as zirconium oxide, are deposited on the substrate 18 by using powder feed rates, work speeds and traverse rates at the lower end of the ranges. The more porous coatings for thermal barriers with their excellent thermal shock resistance and lower thermal conductivity are deposited on the substrate 18 by using powder feed rates and work speeds at the higher end of the range. Spray distance should be held to the recommended range since too close a distance results in "glassy" coatings with low thermal shock-resistance and too great a spray distance results in soft, spongy deposits with low physical properties and lowered deposit efficiency.

Substrates having no coating and various ceramic coatings were tested for thermal and abrasion effects. One ready application for a coated substrate is an apparatus for the preparation of titanium dioxide pigments, which requires a stream of hot oxygen to be mixed with a smaller stream of sand and cooled oxygen in order to react with titanium tetrachloride (TiCl4) to produce titanium dioxide pigments. The hot oxygen enters a large pipe, which is ceramic lined, at temperatures of 1700° C. and proceeds to the reaction zone with the cooled oxygen and sand which enters from the back of vessel. The small pipe is called a sand scour nozzle and its walls are hollow. It is water cooled with a water temperature of about 35° C. which increases to 45° C. after cooling. The outside of the nozzle is exposed to oxygen at 1700° and needs protection in order to prevent the metal pipe from melting and water getting into the oxygen because of the melt down.

A number of ceramic coatings were tested to protect the outer walls of the sand scour nozzle. The results of the experiments are discussed in the examples below.

A convenient method of coating a metal substrate is to place it in a lathe and rotate or turn the substrate while it is in a stationary condition. The first bond coating of stainless steel is applied to the substrate, using a number of passes of the flame spray gun, while the substrate is rotating in a stationary position.

Each coating is applied at high temperature which is necessary to maintain the material to be applied in particulate form. The application of each coating layer at high temperatures necessarily increases the temperature of the substrate. The flame spraying of the material to be applied involves heating the material, such as metal or ceramic to the point where it can be atomized and propelled through the gun on the substrate to be coated. This results in the temperature of the substrate increasing rapidly during the application of each coating layer. This rapid increase in the temperature of the substrate results in the expansion of the substrate. The application of each coating layer must be done in a manner to prevent the temperature of the substrate from becoming so high that disintegration or cracking of the coatings occurs during cooling.

The temperature of the substrate during the application of the coatings can be controlled by cooling the substrate to below 250° F. between each pass and limiting the duration of the pass to make certain that the upper temperature limit is no exceeded.

Preferably, four to six passes are used to coat the substrate in a satisfactory fashion. After the application of the stainless steel layer, the intermediate layer of $ZrO_2$ is sprayed on top of the stainless steel coating with a number of passes in the same manner, cooling the substrate with air to less than 250° F. prior to beginning the next pass. More passes are generally necessary with the $ZrO_2$ layer than with the stainless steel coating, preferably from ten to twelve passes are used. Finally, an $Al_2O_{23}$ layer is sprayed over the $ZrO_2$, also using a number of passes and cooling to less than 250° F. between each pass. Approximately the same number of passes are desirable in spraying the $Al_2O_3$ layer as with the $ZrO_2$ layer. With these final two layers, the substrate is cooled to less than 250° F. with air. The duration of each pass needs to be controlled to make certain that the temperature of the substrate does not exceed 700° F. and preferably be below 500° F. to prevent excessive expansion of the substrate. It is preferred for most applications that each coating layer have a thickness in the following ranges:

| Stainless Steel | 0.002 in. to 0.010 in. |
| $ZrO_2$ | 0.005 in. to 0.020 in. |
| $Al_2O_3$ | 0.005 in. to 0.015 in. |

Other types of thermal resistant compositions may be substituted for the zirconium oxide as long as the composition can be heated to particulate form and bonds to the metallic substrate. For example, a combination of zirconium oxide containing calcium oxide and titanium oxide can be used for the thermal resistance layer.

Other abrasion resistant coatings such as a combination of aluminum oxide and zirconium oxide can be used. It is of course necessary that the abrasion resistant material can be heated into particulate form for applying to the metallic substrate. The combination of the aluminum oxide and the zirconium oxide for the abrasion resistant coating is not as resistant as a composition of aluminum oxide alone.

Typical metallic substrates to which this ceramic coating of this invention is applied are ferrous metal substrates, such as mild steel. Other ferrous metal substrates may comprise low alloy and medium alloy steels. The ceramic coating also may be applied to a number of other metallic substrates including cast iron.

While flame spraying is a preferred method of applying these coatings, the invention is not so restricted. Other methods for applying these coatings can also be utilized provided each coating is applied in the order specified, and the metallic substrate is cooled to less than 250° F. between each coating pass. The materials used in these coatings have high melting points so it is necessary to have a coating system that is capable of melting the material being applied. The flame spray gun is a preferred manner of producing the heat for melting of the coating compositions into particulate form. Other heating mechanisms such as electric arcs, resistance heaters or induction heaters may be used. The gas can be one of the combustion gasses or an inert gas such as nitrogen. In a plasma spray gun, the primary plasma gas is nitrogen or argon.

The coating material may be fed into a heating zone in the form of a rod or wire. In the wire type flame spray gun the rod or wire to be sprayed is fed into the heating zone where it is melted and atomized, usually by blast gas, and then propelled in finely divided form onto the surface to be coated.

The zirconium oxide and aluminum oxide coatings may be stabilized by the addition of small amounts of calcium oxide to one or more of the layers. The zirconium oxide may contain some hafnium oxide and incidental impurities. The zirconium oxide may also be stabilized by the addition of a small amount of $Y_2O_3$ (yttrim oxide).

Table I presents some chemical and physical properties of $Al_2O_3$ and $ZrO_2$. It should be noted that the hardness and abrasion-resistance of $Al_2O_3$ is nearly twice that of the $ZrO_2$. As $ZrO_2$ is a heat insulator, it is softer and able to compress slightly. The $ZrO_2$ coating can contract and expand along with the stainless steel and the base metal without fracturing the $Al_2O_3$ coating.

TABLE 1

Properties of Ceramic Powders

| Property | $ZrO_2$ | $Al_2O_3$ |
|---|---|---|
| MP °F. | 4500 | 3600 |
| Mean Specific Heat (BTU/lb/°F.) | 0.175 | 0.28 |
| Conductivity (BTU/HR/ft$^2$ - inch/°F.) | 8 | 19 |
| Thermal Shock Resistance | very good | good |
| Crystal Hardness Knoopscale (%) | 8 | 8 |
| Abrasion Resistance | good | very good |

The method of this invention can be used to put ceramic coatings on sewer nozzles, reactor tubes and any other types of metal substrate where it is desirable to reduce thermal wear and thermal weakening.

EXAMPLE 1-NO COATING

Sand and oxygen at 25° C. temperature is emitted from a metal pipe and mixes with a large quantity of oxygen at 1700° C. The sand particles in the system are very abrasive. The inside of the pipe is water cooled to 35° C. The nozzles had to be replaced in a very short time (i.e., 500-800 tons of product).

EXAMPLE II—ZIRCONIUM OXIDE COATING

It was decided to investigate the spray coating of the exterior of the sand scour nozzle with $ZrO_2$ because of its excellent heat resistance. The interior of the sand nozzle was cooled by a hollow water jacket. The sand oxygen mixture of Example 1 was passed through the pipe which had a thin coating of $ZrO_2$ on the exterior of the pipe. The $ZrO_2$ insulation allowed production of about 1000 tons of product before pipe failure. Although there was considerable improvement compared to no coating, the rapid failure of the $ZrO_2$ coating mined the metal of the pipe and the pipe had to be completely rebuilt.

EXAMPLE III

The next experiment involved spraying two layers of a stainless steel bond coating onto the metal pipe, then coating the stainless steel layers with zirconium oxide followed by a coating of aluminum oxide. The coated pipe was not cooled between the application of the coatings. After the spraying had been completed, it appeared that the experiment had been a success. The unit was allowed to cool; however, in a few minutes the ceramic layers disintegrated and fell to the bottom of the lathe.

EXAMPLE IV

Another experiment was conducted where between each coating pass, the metal substrate was cooled to less than 250° F. First, several passes were made creating the stainless steel coating. Between each pass, the pipe was cooled to less than 250° F. Second, the zirconium oxide coating was created using a number of passes, with the pipe being cooled to below 250° F. between each pass of zirconium oxide. Third, the aluminum oxide coating was created using several passes with the metal pipe being cooled to below 250° F. between each pass. The coatings did not disintegrate, and the coated unit was put into service. The first installation operated successfully for a total of 2100 tons of production of titanium dioxide and was still in good condition. In addition to the great improvement in production rate, it only required four man hours to refurbish the worn unit instead of 16-24 hours necessary to make a complete new tube.

EXAMPLE V

The metal substrate coated in this application was a water-jacketed sand-scour nozzle which operates at an outside temperature of 1700° C., and an inside temperature of 25°-35° C. The completed metal nozzle, which is hollow, was placed in a lathe and rotated in a stationary position. The first bond coating of stainless steel was applied using about six passes of the flame-spray gun, while the tube was rotating in the lathe. Each pass required from 20-30 seconds. Between each pass, the nozzle was cooled to less than 250° F. with air. The intermediate layer of $ZrO_2$ was sprayed on top of the stainless steel coating with 10-12 passes in the same manner, cooling the tube with air to less than 250° F. prior to beginning the next pass. The final $Al_2O_3$ layer was sprayed over the $ZrO_2$ also using 10-12 passes and cooling to less than 250° F. between each pass. Each coating layer had the following thickness:

| Stainless Steel | 0.005 in. |
| --- | --- |
| $ZrO_2$ | 0.015 in. |
| $Al_2O_3$ | 0.010 in. |

$ZrO_2$ is stabilized with $Y_2O_3$ (yttrium oxide). This nozzle had a much longer working life than a nozzle not so coated (i.e., 2100 tons of product).

The detailed description of a preferred embodiment and Examples disclosed above are for illustrative purposes only and are not intended to limit the scope and equivalents of the invention, which is as defined by the following claims.

What is claimed is:

1. A method for coating metal substrates with a multi-layer ceramic composition comprising the steps of:
   a. applying at least one coating layer of stainless steel to the substrate;
   b. applying at least one coating layer of a thermal shock-resistant ceramic coating over the stainless steel layer while maintaining the temperature of the coated substrate below about 700° F.
   c. cooling the coated substrate to a temperature of below about 250° F.; and
   d. applying at least one coating layer of an abrasion-resistant ceramic material over the thermal shock-resistant ceramic material while maintaining the temperature of the substrate below about 700° F.

2. The method as claimed in claim 1, wherein each of the coating layers of stainless steel, thermal shock-resistant ceramic material, and abrasion-resistant ceramic material is applied using a flame spray technique.

3. The method as claimed in claim 2, wherein each of the coating layers of stainless steel, thermal shock-resistant ceramic material, and abrasion-resistant ceramic material is produced by multiple passes.

4. The method as claimed in claim 3, wherein each of the passes of the flame spray means is controlled so the temperature of the metal substrate does not increase above about 500° F.

5. The method as claimed in claim 4, wherein the substrate is cooled to a temperature of below about 250° F. between each pass of the flame spray means for each coating.

6. The method as claimed in claim 5, wherein the thermal shock-resistant ceramic material is zirconium oxide.

7. The method as claimed in claim 6, wherein the zirconium oxide contains a stabilizer.

8. The method as claimed in claim 5, wherein said abrasion-resistant ceramic material is aluminum oxide.

9. A method for coating a metal substrate with a multi-layer ceramic composition comprising the steps of applying at least one coating layer of stainless steel to the substrate, applying a coating layer of a thermal shock-resistant ceramic to the substrate and applying a coating layer of an abrasion-resistant ceramic material to the substrate while controlling the temperature of the substrate during the application of said coating layers to prevent breakage and cracks from developing in the coatings upon cooling.

* * * * *